US008621270B2

(12) United States Patent  (10) Patent No.: US 8,621,270 B2
Isherwood et al.  (45) Date of Patent: Dec. 31, 2013

(54) SYSTEM AND METHOD FOR TRANSPARENT RECOVERY OF DAMAGED OR UNAVAILABLE OBJECTS IN A REPLICATED OBJECT STORAGE SYSTEM

(75) Inventors: Benjamin Isherwood, Tewksbury, MA (US); Donald P. Pannese, Westford, MA (US); Richard Rogers, Stoughton, MA (US); Vitaly Zolutusky, Arlington, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 544 days.

(21) Appl. No.: 12/889,641

(22) Filed: Sep. 24, 2010

(65) Prior Publication Data

US 2012/0079315 A1  Mar. 29, 2012

(51) Int. Cl.
 *G06F 11/00*  (2006.01)
(52) U.S. Cl.
 USPC ............. 714/6.22; 714/6.1; 714/6.2; 714/6.3; 714/42
(58) Field of Classification Search
 USPC ............ 714/6.1, 6.2, 6.21, 6.23, 6.3, 6.31, 42
 See application file for complete search history.

(56) References Cited

U.S. PATENT DOCUMENTS

| 6,539,492 | B1 | 3/2003 | Arsenault et al. |
| 7,155,466 | B2 | 12/2006 | Rodriguez et al. |
| 7,500,020 | B1 * | 3/2009 | Kabra et al. ................... 709/248 |
| 7,778,972 | B1 * | 8/2010 | Cormie et al. ................ 707/626 |
| 7,818,607 | B2 * | 10/2010 | Turner et al. ................. 714/6.12 |
| 2006/0026219 | A1 | 2/2006 | Orenstein et al. |
| 2007/0189153 | A1 | 8/2007 | Mason |
| 2008/0133694 | A1 | 6/2008 | Holt |

FOREIGN PATENT DOCUMENTS

WO  2008/040066 A1  4/2008

* cited by examiner

*Primary Examiner* — Joseph D Manoskey
(74) *Attorney, Agent, or Firm* — Mattingly & Malur, PC

(57) ABSTRACT

A redundant array of independent nodes are networked together. Each node executes an instance of an application that provides object-based storage. The nodes are grouped into a plurality of systems each having multiple nodes. An object recovery method comprises: receiving, by a first system of the plurality of systems from a client application, a read request for an object, the object having been replicated to/from at least one second system among the plurality of systems; if the object of the read request is available in the first system, returning by the first system the object of the read request to the client application; and if the object of the read request is not available in the first system, performing a read from replica process by the first system to access a replica of the object from a second system among the plurality of systems and using the replica of the object to return the object of the read request to the client application.

16 Claims, 6 Drawing Sheets

SYSTEM AND METHOD FOR TRANSPARENT RECOVERY OF DAMAGED OR UNAVAILABLE OBJECTS IN A REPLICATED OBJECT STORAGE SYSTEM

BACKGROUND OF THE INVENTION

The present invention relates generally to storage systems and, more particularly, to system and method for transparent recovery of damaged or unavailable objects in a replicated object storage system.

In a replicated environment, in the event where an object is not available on the primary system, the client application has traditionally had to do the work of redirecting to the replica to access the object. As a result, the client application has the burden of managing additional work.

BRIEF SUMMARY OF THE INVENTION

Exemplary embodiments of the invention provide a replicated object storage system or content platform that takes on the burden of retrieving and repairing a damaged or otherwise unavailable object from the replica. In this way, the client application does not have to manage additional work of redirecting to the replica to access the object. To better service customers, a "read from replica" feature enables the content platform to service the read requests from replica in a cluster/system containing a replica of the object when it cannot get the object from a primary cluster/system in the content platform. The following are some of the reasons an object is not available on the primary system: (1) the object in the content platform Storage Manager is corrupted; (2) the content platform Storage Manager on which the object exists is down; and (3) the node on which the object exists (which in turn caused the Storage Manager on which object existed to go down). With this invention, the content platform will be able to read the object from replica (assuming the object is already copied over to replica) and service the client request.

When a request is made to read an object stored in a content platform with replication enabled, the request is honored by a primary system that receives the request. The primary system tries to read the object from its Storage Manager. If the read from primary system storage fails, and the namespace where the object resides has the read from replica feature enabled, the primary system tries to read the object from replica. If the object is found on replica, the process proceeds as follows: (1) for HTTP requests, the object stream is returned from replica to the client application and once the request has been satisfied, the content platform will begin the repair from replica for the object; and (2) for all other protocols, the object is repaired first and then an error is returned to the application with retry error code.

One aspect of the present invention is directed to a redundant array of independent nodes networked together, wherein each node executes an instance of an application that provides object-based storage, the nodes being grouped into a plurality of systems each having multiple nodes. An object recovery method comprises: receiving, by a first system of the plurality of systems from a client application, a read request for an object, the object having been replicated to/from at least one second system among the plurality of systems; if the object of the read request is available in the first system, returning by the first system the object of the read request to the client application; and if the object of the read request is not available in the first system, performing a read from replica process by the first system to access a replica of the object from a second system among the plurality of systems and using the replica of the object to return the object of the read request to the client application.

In some embodiments, the read from replica process comprises: if the read request utilizes HTTP protocol, retrieving by the first system the replica of the object from the second system and using the replica of the object to return the object of the read request to the client application, and then initiating by the first system repair from replica of the object in the first system utilizing the replica of the object; and if the read request utilizes a protocol different from HTTP protocol, returning by the first system a "retry" notice to the client application, retrieving by the first system the replica of the object from the second system, performing repair from replica of the object in the first system utilizing the replica of the object, and then returning by the first system the repaired object to the client application. The read from replica process further comprises: if the read request utilizes HTTP protocol, performing the repair from replica of the object in the first system out of band after completing the read request to the client application; and if the read request utilizes a protocol different from HTTP protocol, blocking the read request for a preset period while performing repair from replica of the object in the first system utilizing the replica of the object, and returning retryable failure to the client application while repair from replica of the object is in progress.

In specific embodiments, the method further comprises if the object of the read request is initially available in the first system but becomes unavailable during a process of returning by the first system the object of the read request to the client application, then performing the read from replica process for entire data of the object of the read request and using the entire data from the read from replica process to return the object of the read request to the client application. The read from replica process comprises: if the read request utilizes HTTP protocol, retrieving by the first system the replica of the object from the second system and using the replica of the object to return the object of the read request to the client application, and then initiating by the first system repair from replica of the object in the first system utilizing the replica of the object; and if the read request utilizes a protocol different from HTTP protocol, returning by the first system a "retry" notice to the client application, retrieving by the first system the replica of the object from the second system, performing repair from replica of the object in the first system utilizing the replica of the object, and then returning by the first system the repaired object to the client application.

In some embodiments, the read from replica process follows a replication chain from the first system via at least one intermediate second system to a final second system in order to locate the replica of the object of the read request to be used, the object having been replicated from the first system to the at least one intermediate second system and via the at least one intermediate second system to the final second system; and no repair of replica of the object of the read request is performed in the at least one intermediate second system.

Another aspect of the invention is directed to an apparatus for object recovery in a redundant array of independent nodes networked together, wherein each node executes an instance of an application that provides object-based storage, the nodes being grouped into a plurality of systems each having multiple nodes. The apparatus comprising a processor, a memory, and a read request processing module provided for each system. The read request processing module is configured to: receive from a client application a read request for an object, the object having been replicated from/to a first system in which the read request processing module resides to/from at least one second system among the plurality of systems; if the object of the read request is available in the first system, return the object of the read request to the client application; and if the object of the read request is not available in the first system, perform a read from replica process to access a replica of the object from a second system among the plurality of systems and use the replica of the object to return the object of the read request to the client application.

Another aspect of this invention is directed to a computer-readable storage medium storing a plurality of instructions for controlling a data processor to manage query results in a redundant array of independent nodes networked together, wherein each node executes an instance of an application that provides object-based storage, the nodes being grouped into a plurality of systems each having multiple nodes. The computer-readable storage medium is provided in each system. The plurality of instructions comprise instructions that cause the data processor to receive from a client application a read request for an object, the object having been replicated from/to a first system in which the computer-readable storage medium resides to/from at least one second system among the plurality of systems; instructions that cause the data processor, if the object of the read request is available in the first system, to return the object of the read request to the client application; and instructions that cause the data processor, if the object of the read request is not available in the first system, to perform a read from replica process to access a replica of the object from a second system among the plurality of systems and use the replica of the object to return the object of the read request to the client application.

These and other features and advantages of the present invention will become apparent to those of ordinary skill in the art in view of the following detailed description of the specific embodiments.

DETAILED DESCRIPTION OF THE INVENTION

Figure 1:
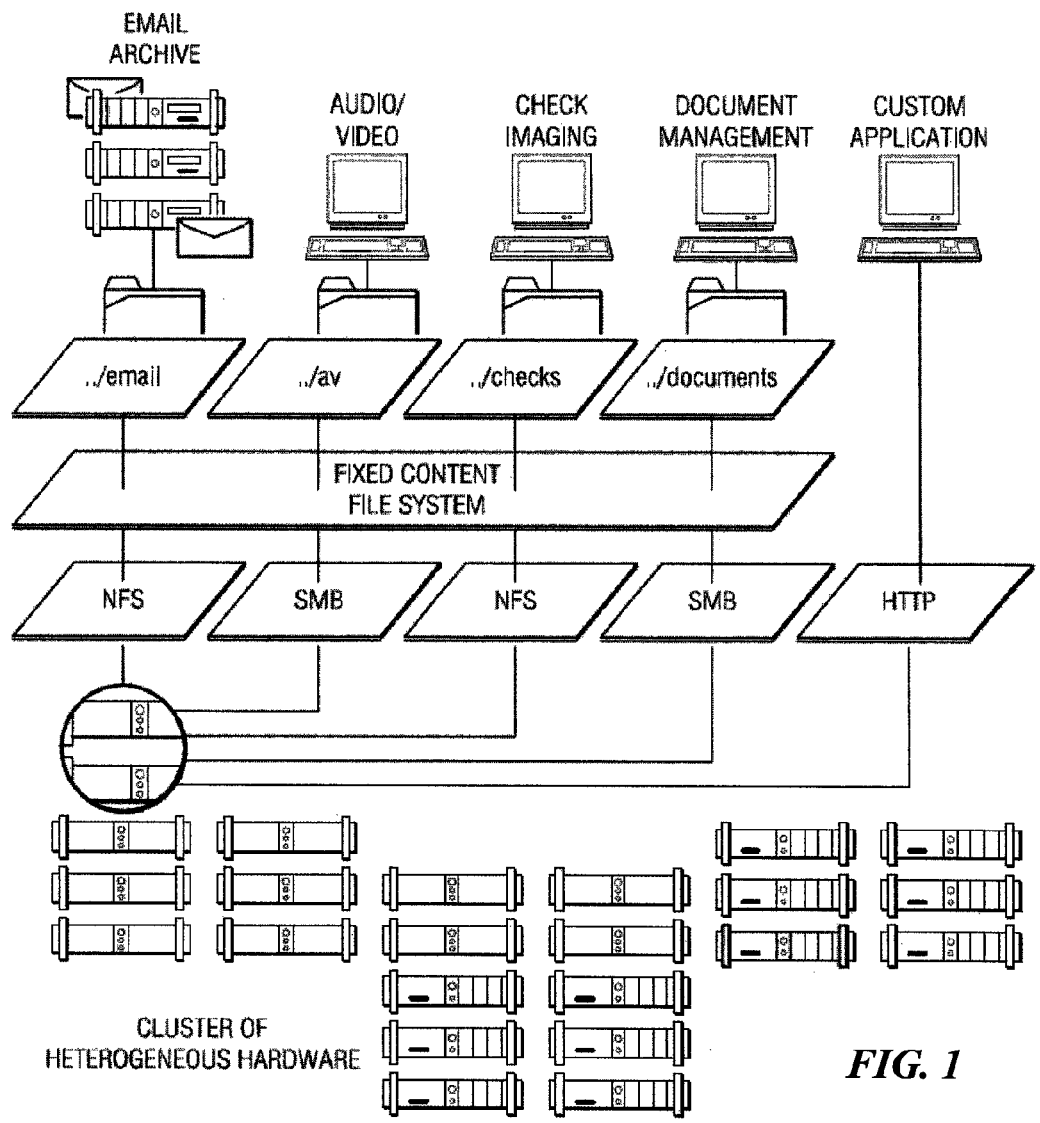
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for transparent recovery of damaged or unavailable objects in a replicated object storage system.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
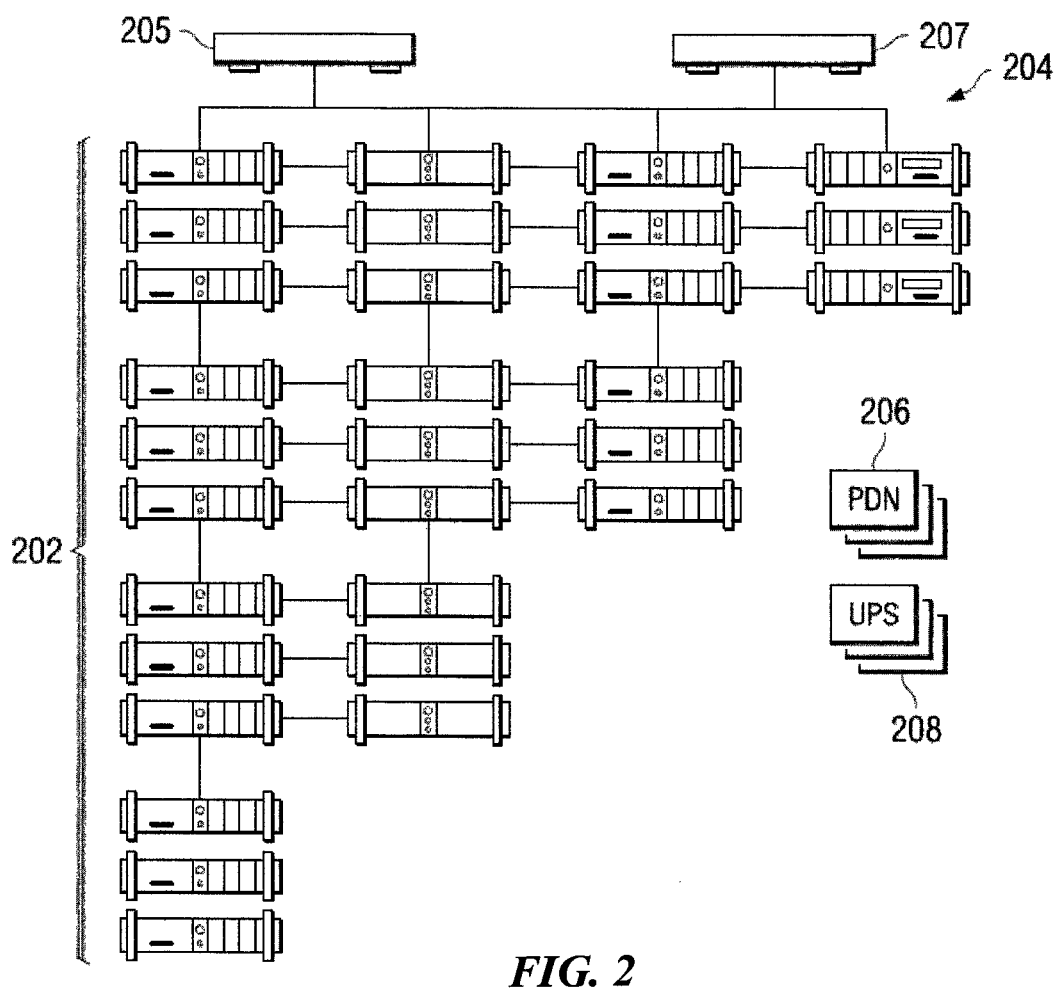
FIG. 2 is a simplified representation of a redundant array of independent nodes each of which is symmetric and supports an archive cluster application.

As described in commonly-owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
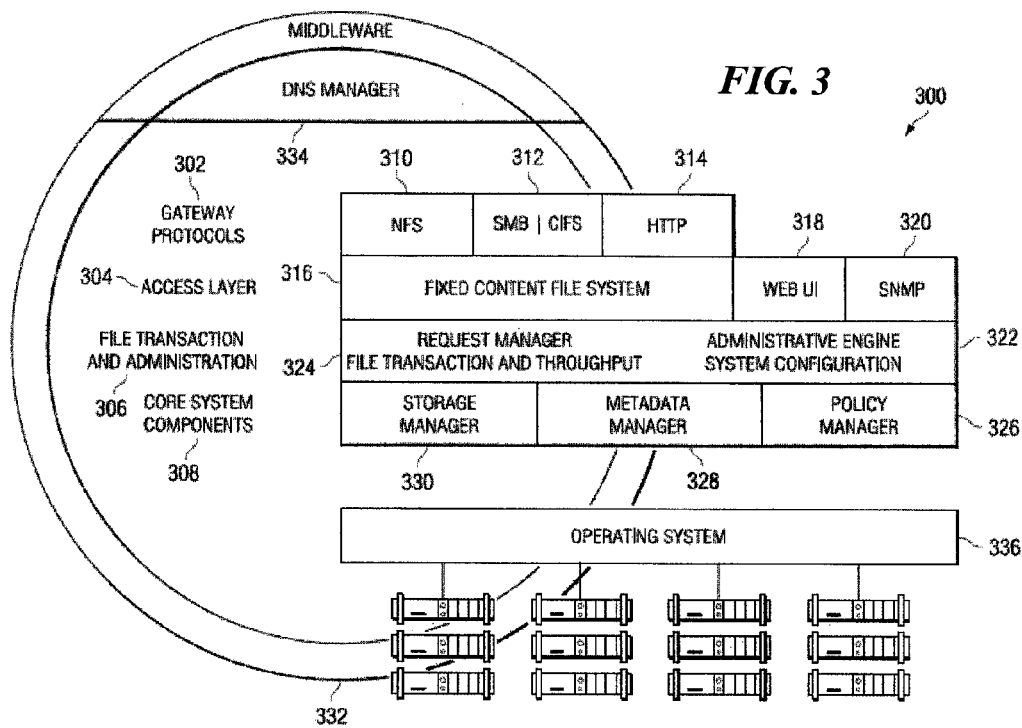
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, the ArC application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publications 2007/0189153 and 2006/0026219, which are incorporated herein by reference.

II. Metadata Management

A metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types (which are merely illustrative):

ExternalFile: a file as perceived by a user of the archive;

InternalFile: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g., number of files) at a point in time; and PolicyState: a violation of some policy.

Each metadata object may have a unique name that preferably never changes. Metadata objects are organized into regions. A region comprises an authoritative region copy and a "tolerable points of failure" (TPOF) number (a set of zero or more) backup region copies. With zero copies, the metadata management system is scalable but may not be highly available. A region is selected by hashing one or more object attributes (e.g., the object's name, such as a fully-qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme.

Each region may be stored redundantly. As noted above, there is one authoritative copy of the region, and zero or more backup copies. The number of backup copies is controlled by the metadata TPOF configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object. While Postgres is a preferred database, any convenient relational database (e.g., Oracle, IBM DB/2, or the like) may be used.

As used herein, a namespace is a logical partition of the cluster, and essentially serves as a collection of objects particular to at least one defined application. Each namespace has a private filesystem with respect to other namespaces. Moreover, access to one namespace does not grant a user access to another namespace. A cluster/system or nodes is a physical archive instance.

Figure 4:
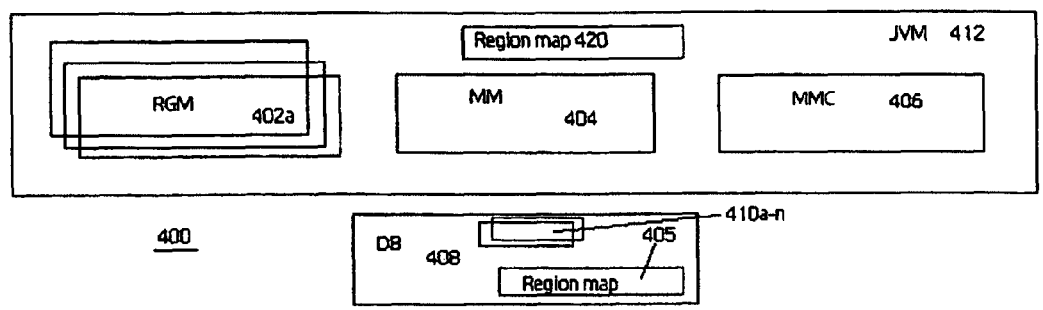
FIG. 4 illustrates an example of the components of the metadata management system on a given node of the cluster.

As illustrated in FIG. 4, each node 400 has a set of processes or components: one or more region managers (RGM) 402a-n, a metadata manager (MM) 404, at least one metadata manager client (MMC) 406, and a database 408 having one or more schemas 410a-n. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. Each node preferably has the same global view of the region map, with requirement being enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node.

As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an integer between 0x0 and 0x3fffff inclusive, i.e., 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM dies, a new region map is issued.

The metadata management system keeps copies of a region synchronized. An update that is done to an object in the authoritative region copy is replicated on the backup region copies. Once an update is committed by the authoritative RGM, the same update is applied to all backup region copies. The metadata management system ensures that any such failure (whether at the node level, the region manager level or the like) causes reassignment of region copies on the failed node; thus, the integrity of the remaining region copies is guaranteed. If a node containing an authoritative RGM fails, then the backup RGMs are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

It should be noted that there is no requirement that the number of regions correspond to the number of nodes. More generally, the number of regions is uncorrelated with the number of nodes in the array of independent nodes. Additional details of the metadata management can be found in U.S. Patent Publication 2006/0026219.

III. Transparent Recovery of Damaged or Unavailable Objects

According to exemplary embodiments, the replicated object storage system or content platform takes on the burden of retrieving and repairing a damaged or otherwise unavailable object from the replica. A "read from replica" feature enables the content platform to serve the read requests from replica in a cluster/system containing a replica of the object when it cannot get the object from a primary cluster/system in the content platform.

III.A. Configuration to Enable Recovery of Unavailable Objects

For each namespace, if Replication is enabled, a second option "Enable read from replica" is available to be configured. If this option is enabled, the "read from replica" process described below will be performed to recover unavailable (including damaged) objects. As described below, the "read from replica" process includes a repair from replica procedure.

III.B. "Read from Replica" Algorithm

1. The primary system receives a read request from a client application.

2. The primary system looks up metadata of the read request in the Metadata Manager (MM). If the metadata corresponding to the read request is found in the MM and the metadata is healthy, then the read process proceeds to step 3. If the metadata is not found in the MM, then the primary system sends a failure notice to the client application 3. The primary system looks up the data to be read pursuant to the read request in the Storage Manager (SM). If the data is found, the data is read and returned to the client application. If the data and/or the metadata corresponding to the read request is not found, then the primary system performs read from replica. A situation may arise in which a read process of the data from the SM has begun and then the SM goes down during the read process. In that case, the primary system performs read from replica for the whole data (i.e., without regard to the data that had been successfully read before the SM went down). The primary system will not initiate a partial read from the replica in this case. If the SM is not there or is otherwise unavailable, then the read process proceeds to step 4.

4. The primary system performs read from replica. The read from replica process is either successful or not. If the read from replica process is successful, the primary system returns the read data to the client application if the read request is an HTTP request and the primary system had not started data transfer before the read process failed. If the SM is operational but the object or file is not found in the primary system or if there is bad hash, the primary system puts the file into repair from replica queue so that the file is repaired right away. On the other hand, the primary system may have already started data transfer in response to the HTTP request, and then the file is not found or bad hash occurs during the data transfer but before it is completed. In that case, the primary system returns 503 error to the client application, and starts repair of the file from replica. If the read request utilizes other protocols (e.g., NFS/CIFS request), the primary system returns a retryable error to the client application and starts repair from replica. The primary system may implement the above-described process of handling the read request in hardware or software in the form of a read request processing module, for example, which includes a "read from replica" sub-module or subroutine, a "repair from replica" or "remote repair" sub-sub-module or sub-subroutine, and the like.

Remote Repair

As described above, when the request is made to read an object stored in a content platform with replication enabled, the request is honored by a primary system that receives the request. The primary system tries to read the object from its Storage Manager. If the read from primary system storage fails, and the namespace where the object resides is set to read from replica, the primary system tries to read the object from replica. If the object is found on replica, the process involving remote repair proceeds as follows. For HTTP requests, the object stream is returned from replica to the client application and once the request has been satisfied, the content platform will begin the repair from replica for the object. For all other protocols, the object is repaired first and then an error is returned to the application with retry error code. The following provides additional details of the remote repair.

For HTTP, the read request processing program starts repair and returns the stream from replica (replica system or second system) to the caller (primary system or first system) immediately. If the limit for concurrent repair connections is reached, the program returns 503 error to the caller. If midstream failure occurs during return of the stream, the program returns retry-able failure to the caller. The program adds special read metadata-only and read data-only request for read from replica. After serving the stream from replica to the caller, the program starts repair of the requested file from the replica to the local node. This should be done out of band after completing the read request from the user or client. The drawback of this approach is that the program will be reading the file/object from replica twice, but the program will serve it as fast as possible to the user and have the file repaired on the local cluster right away.

For CIFS/NFS, the read request is blocked or delayed for short periods (e.g., 0.5-5 seconds) while repairing and retry-able failure is returned to all readers while repair is in progress. Only one repair request for a specific object is placed on the queue for all requesters.

Figure 5A:
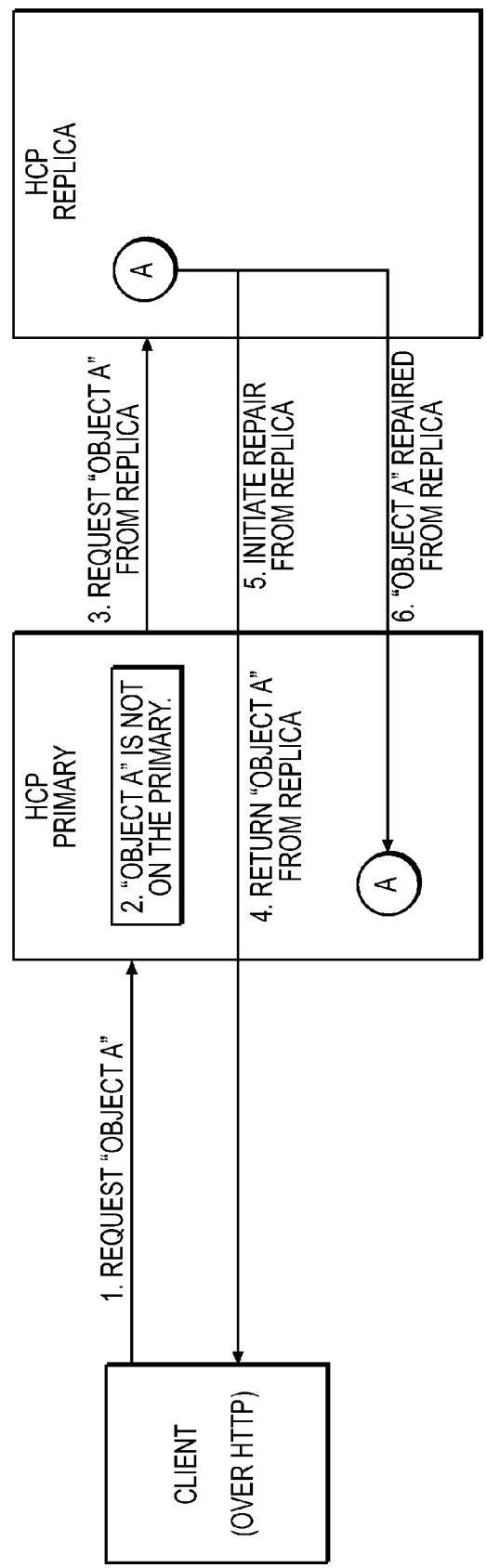
FIG. 5 is an example of flow diagrams illustrating the "read from replica" process and "remote repair" process for (a) HTTP protocol and (b) CIFS/NFS protocol.
Figure 5B:
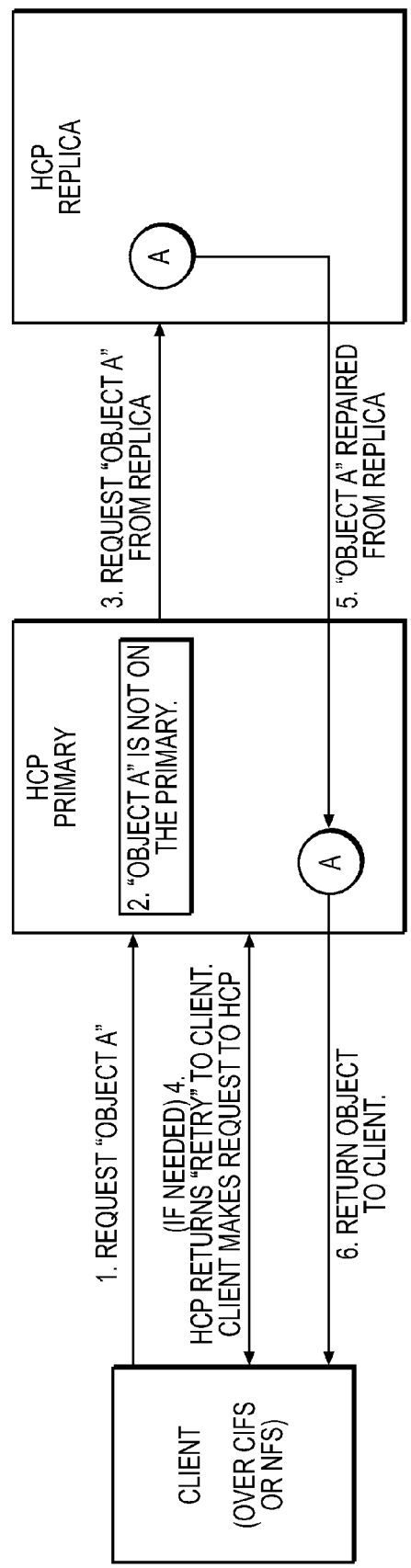

FIG. 5 is an example of flow diagrams illustrating the "read from replica" process and "remote repair" process for (a) HTTP protocol and (b) CIFS/NFS protocol. In the HTTP client example, the read request processing procedure includes the following steps: (1) request Object A from the client application to the primary system; (2) Object A is not on the primary system; (3) the primary system retrieves Object A from replica in the replica system; (4) the retrieved Object A from replica is provided to the client; (5) the primary system initiates repair from replica utilizing the replica in the replica system; and (6) Object A in the primary system is repaired from replica. In the CIFS/NFS client example, the read request processing procedure includes the following steps: (1) request Object A from the client application to the primary system; (2) Object A is not on the primary system; (3) the primary system requests Object A from replica; (4) if needed, the primary system returns a "retry" notice to the client application, and the client makes a request to the primary system in response thereto; (5) Object A in the primary system is repaired from replica; and (6) the primary system returns the repaired Object A to the client application.

The read from replica process with remote repair follows the replication link or chain from the primary system (source cluster) to the next replica system until the data of the read request is found in the final replica system. If there are one or more intermediate replica systems between the primary system and the final replica system, they function as transports for the process but no remote repair is performed for the object/file in those one or more intermediate replica systems as part of the read from replica process. Instead, those objects will be repaired during the periodic process to synchronize replicated data in the content platform.

Of course, the system configurations illustrated in FIGS. 1 and 4 are purely exemplary of content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for transparent recovery of damaged or unavailable objects in a replicated object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. In a computer system having a plurality of nodes networked together, wherein the nodes are grouped into a plurality of systems each having multiple nodes, an object recovery method comprising:
   receiving, by a first system of the plurality of systems from a client computer, a read request for an object, the object having been replicated to/from at least one second system among the plurality of systems;
   if the object of the read request is available in the first system, returning by the first system the object of the read request to the client application; and
   if the object of the read request is not available in the first system, performing a read from replica process by the first system, the read from replica process comprising:
   if the read request utilizes HTTP protocol, retrieving by the first system the replica of the object from the second system and using the replica of the object to return the object of the read request to the client computer, and then initiating by the first system repair from replica of the object in the first system utilizing the replica of the object, and
   if the request utilizes a protocol different from HTTP protocol, returning by the first system a notice to the client computer in order to delay a process for the read request, retrieving by the first system the replica of the object from the second system, performing repair from replica of the object in the first system utilizing the replica of the object, and then returning by the first system the repaired object to the client computer.

2. The method according to claim 1, wherein the read from replica process further comprises:
   if the read request utilizes HTTP protocol, performing the repair from replica of the object in the first system out of band after completing the read request to the client computer; and
   if the read request utilizes a protocol different from HTTP protocol, blocking the read request for a preset period while performing repair from replica of the object in the first system utilizing the replica of the object, and returning retryable failure to the client computer while repair from replica of the object is in progress.

3. The method according to claim 1, further comprising:
   if the object of the read request is initially available in the first system but becomes unavailable during a process of returning by the first system the object of the read request to the client computer, then performing the read from replica process for entire data of the object of the read request and using the entire data from the read from replica process to return the object of the read request to the client computer.

4. The method according to claim 3, wherein the read from replica process comprises:
   if the read request utilizes HTTP protocol, retrieving by the first system the replica of the object from the second system and using the replica of the object to return the object of the read request to the client computer, and then initiating by the first system repair from replica of the object in the first system utilizing the replica of the object; and
   if the read request utilizes a protocol different from HTTP protocol, returning by the first system a notice to the client computer in order to delay a process for the read request, retrieving by the first system the replica of the object from the second system, performing repair from replica of the object in the first system utilizing the replica of the object, and then returning by the first system the repaired object to the client computer.

5. The method according to claim 1,
wherein the read from replica process follows a replication chain from the first system via at least one intermediate second system to a final second system in order to locate the replica of the object of the read request to be used, the object having been replicated from the first system to the at least one intermediate second system and via the at least one intermediate second system to the final second system; and
wherein no repair of replica of the object of the read request is performed in the at least one intermediate second system.

6. An apparatus for object recovery in a computer system having a plurality of nodes networked together, wherein the nodes are grouped into a plurality of systems each having multiple nodes, the apparatus comprising a processor, a memory, and a read request processing module provided for each system, the read request processing module being configured to:
receive from a client computer a read request for an object, the object having been replicated from/to a first system in which the read request processing module resides to/from at least one second system among the plurality of systems;
if the object of the read request is available in the first system, return the object of the read request to the client computer; and
if the object of the read request is not available in the first system, perform a read from replica process, the read from replica process comprising:
if the read request utilizes HTTP protocol, retrieving the replica of the object from the second system and using the replica of the object to return the object of the read request to the client computer, and then initiating repair from replica of the object in the first system utilizing the replica of the object, and
if the read request utilizes a protocol different from HTTP protocol, returning a notice to the client computer in order to delay a process for the read request, retrieving the replica of the object from the second system, performing repair from replica of the object in the first system utilizing the replica of the object, and then returning the repaired object to the client computer.

7. The apparatus according to claim 6, wherein the read from replica process further comprises:
if the read request utilizes HTTP protocol, performing the repair from replica of the object in the first system out of band after completing the read request to the client computer; and
if the read request utilizes a protocol different from HTTP protocol, blocking the read request for a preset period while performing repair from replica of the object in the first system utilizing the replica of the object, and returning retryable failure to the client computer while repair from replica of the object is in progress.

8. The apparatus according to claim 6, wherein the read request processing module is configured to:
if the object of the read request is initially available in the first system but becomes unavailable during a process of returning the object of the read request to the client computer, then perform the read from replica process for entire data of the object of the read request and use the entire data from the read from replica process to return the object of the read request to the client computer.

9. The apparatus according to claim 8, wherein the read request processing module is configured to:
if the read request utilizes HTTP protocol, retrieve the replica of the object from the second system and use the replica of the object to return the object of the read request to the client computer, and then initiate repair from replica of the object in the first system utilizing the replica of the object; and
if the read request utilizes a protocol different from HTTP protocol, return a notice to the client computer in order to delay a process for the read request, retrieve the replica of the object from the second system, perform repair from replica of the object in the first system utilizing the replica of the object, and then return the repaired object to the client computer.

10. The apparatus according to claim 6,
wherein the read from replica process follows a replication chain from the first system via at least one intermediate second system to a final second system in order to locate the replica of the object of the read request to be used, the object having been replicated from the first system to the at least one intermediate second system and via the at least one intermediate second system to the final second system; and
wherein the read request processing module issues no instruction for repair of replica of the object of the read request in the at least one intermediate second system.

11. A non-transitory computer-readable storage medium storing a plurality of instructions for controlling a data processor in a computer system having a plurality of nodes networked together, wherein the nodes are grouped into a plurality of systems each having multiple nodes, wherein the computer-readable storage medium is provided in each system, the plurality of instructions comprising:
instructions that cause the data processor to receive from a client computer a read request for an object, the object having been replicated from/to a first system in which the computer-readable storage medium resides to/from at least one second system among the plurality of systems;
instructions that cause the data processor, if the object of the read request is available in the first system, to return the object of the read request to the client computer; and
instructions that cause the data processor, if the object of the read request is not available in the first system, to perform a read from replica process, the read from replica process comprising:
if the read request utilizes HTTP protocol, retrieving the replica of the object from the second system and using the replica of the object to return the object of the read request to the client computer, and then initiating repair from the replica of the object in the first system utilizing the replica of the object, and
if the read request utilizes a protocol different from HTTP protocol, returning a notice to the client computer in order to delay the read request, retrieving the replica of the object from the second system, performing repair from replica of the object in the first system utilizing the replica of the object, and then returning the repaired object to the client computer.

12. The non-transitory computer-readable storage medium according to claim 11, wherein the read from replica process is performed according to instructions that further comprise:

if the read request utilizes HTTP protocol, instructions that cause the data processor to perform the repair from replica of the object in the first system out of band after completing the read request to the client computer; and if the read request utilizes a protocol different from HTTP protocol, instructions that cause the data processor to block the read request for a preset period while performing repair from replica of the object in the first system utilizing the replica of the object, and return retryable failure to the client computer while repair from replica of the object is in progress.

13. The non-transitory computer-readable storage medium according to claim 11, wherein the plurality of instructions further comprise:

if the object of the read request is initially available in the first system but becomes unavailable during a process of returning the object of the read request to the client computer, instructions that cause the data processor to perform the read from replica process for entire data of the object of the read request and use the entire data from the read from replica process to return the object of the read request to the client computer.

14. The non-transitory computer-readable storage medium according to claim 13, wherein the plurality of instructions further comprise:

if the read request utilizes HTTP protocol, instructions that cause the data processor to retrieve the replica of the object from the second system and use the replica of the object to return the object of the read request to the client computer, and then initiate repair from replica of the object in the first system utilizing the replica of the object; and if the read request utilizes a protocol different from HTTP protocol, instructions that cause the data processor to return a notice to the client computer in order to delay a process for the read request, retrieve the replica of the object from the second system, perform repair from replica of the object in the first system utilizing the replica of the object, and then return the repaired object to the client computer.

15. The non-transitory computer-readable storage medium according to claim 11, wherein the read from replica process follows a replication chain from the first system via at least one intermediate second system to a final second system in order to locate the replica of the object of the read request to be used, the object having been replicated from the first system to the at least one intermediate second system and via the at least one intermediate second system to the final second system; and wherein the read from replica process is performed according to instructions which comprise instructions that cause the data processor to perform repair from replica of the object in the first system utilizing the replica of the object but not to perform repair from replica of the object in the at least one intermediate second system.

16. The non-transitory computer-readable storage medium according to claim 15, wherein the read from replica process is performed according to instructions that comprise:

if the read request utilizes HTTP protocol, instructions that cause the data processor to retrieve the replica of the object from the final second system and use the replica of the object to return the object of the read request to the client computer, and then initiate repair from replica of the object in the first system utilizing the replica of the object; and if the read request utilizes a protocol different from HTTP protocol, instructions that cause the data processor to return a notice to the client computer in order to delay a process for the read request, retrieve the replica of the object from the final second system, perform repair from replica of the object in the first system utilizing the replica of the object, and then return the repaired object to the client computer.

* * * * *